UNITED STATES PATENT OFFICE.

JAMES BURBRIDGE, OF LONDON, ENGLAND.

PROCESS OF PRODUCING VARIEGATED RUBBER.

SPECIFICATION forming part of Letters Patent No. 510,888, dated December 19, 1893.

Application filed August 30, 1892. Serial No. 444,558. (No specimens.) Patented in England May 9, 1892, No. 8,765; in France August 24, 1892, No. 223,902, and in Germany November 4, 1892, No. 69,007.

*To all whom it may concern:*

Be it known that I, JAMES BURBRIDGE, of the firm of Messrs. W. Warne & Co., of Tottenham, London, in the county of Middlesex, England, have invented a certain new and useful Process of Producing Variegated Rubber for Manufacturing Purposes, of which the following is a specification, the same being embraced in Letters Patent of Great Britain, No. 8,765, dated May 9, 1892; in France No. 223,902, dated August 24, 1892, and in Germany, No. 69,007, dated November 4, 1892.

The object of this invention is to produce a rubber compound which, when made up into articles, will have a variegated appearance.

In carrying out my invention, I take layers or sheets of rubber compound of different colors, say red and black, which I pile one on top of the other, in any order, to the thickness or height I require, and I consolidate this pile of sheets by placing it under hydraulic or other pressure. From the block or slab thus formed, I cut off a strip, and holding the two ends firmly, I twist the strip any number of times, so that each layer of rubber of which the strip is composed will take a spiral form. The amount of twist given to the strip will determine the character or appearance of the rubber. Thus, if twisted up tightly, the rubber will appear subsequently of a knotted pattern, but if not twisted so much, the design will have the appearance somewhat like wood with an open grain. These twisted strips I then place in a suitable mold, and set them under pressure and heat in a manner now well understood. When taken out of the mold, the twisted strips will retain their set form for any length of time. I then take the strips, and cut and join up the two ends in the usual way to form rings. A number of these rings I then string on a mandrel, place them in a cylindrical mold, and subject them to continuous pressure during, say, twelve hours, by which time perfect union between all the rings will have taken place, and they will form a solid cylinder. This cylinder is then withdrawn from the mold, is placed in a cutting machine, and presented longitudinally to a cutter, so that it may be cut up into sheets of any desired thickness in the usual way. The sheets thus produced will have a "variegated" appearance on both sides, that is to say, they will have a ground of one color (red), with lines of another color (black) crossing at all kinds of angles, giving a novel and fanciful appearance to the surface of the sheets. These variegated sheets are then cut up and made into various articles, which are vulcanized in the usual way.

In some cases, as, for instance, in the manufacture of variegated elastic bands, the cylinder may be subjected to the vulcanizing process, after which the bands may be cut in a lathe, or other convenient manner, from the vulcanized cylinder, transversely of the same; or the twisted strips, when joined up and made into rings, may be vulcanized in that form, and the bands may be cut from the rings in the lathe, or in any other convenient manner, after vulcanization. The result of this latter operation will be, that the bands cut will vary in size, making what is known in the trade as a complete series, and in no case will any two bands have exactly the same design, and there will be absolutely no waste. It will be understood that for such goods as elastic bands, pure rubber must be used in the manufacture, but for many other goods pure rubber is not needed, especially where a certain degree of hardness is required. My process applies equally to the production of variegated sheets of other materials capable of vulcanization.

I would here remark that the above operations are given as samples only. The manufacture of the sheets or other articles may be carried out in any well known manner, without departing from the nature of my invention, the essential feature of which is, the twisting of the strips of consolidated layers of different colored compounds prior to their being subsequently treated in any well known manner.

Having now described the nature of my said invention and in what manner the same is to be performed, I claim—

1. The process of producing variegated rubber sheets for manufacturing purposes, the same consisting in twisting strips of consolidated layers of different colored compounds, making up the twisted strips into rings or cylinders, and cutting shavings or sheets therefrom, either before or after vulcanization, as set forth.

2. The process of making sheets of variegated rubber as herein described, consisting in building up a pile or block of sheets of different colored compounds, consolidating the same by pressure, cutting strips therefrom, twisting and setting said strips, joining the ends to form rings, piling a number of rings one upon another, consolidating the same by pressure to form a homogeneous mass or body and finally cutting the sheets therefrom, substantially as described.

3. The process of making rubber bands as herein described, consisting in building up a pile or block of sheets of different colored compounds, consolidating the same, twisting and setting strips cut therefrom, and forming the same into rings, piling a number of rings one on the other, and consolidating the same by pressure to form a cylinder, vulcanizing said cylinder, and finally cutting therefrom the bands, as set forth.

4. The process of making rubber bands as herein described, consisting in building up a pile or block of sheets of different colored compounds, consolidating the same, twisting and setting strips cut therefrom, joining the ends of the twisted strips and vulcanizing, and finally cutting the bands from the rings thus formed in a lathe or otherwise, as set forth.

5. As a new article of manufacture the sheet or shaving of variegated rubber formed by cutting the same from a body or mass composed of twisted strips of consolidated layers of different colored compounds, substantially as described.

JAMES BURBRIDGE.

Witnesses:
   H. K. WHITE,
   H. F. C. GOETZ.